Aug. 22, 1933.  G. P. ANSTISS  1,923,806
PEELING MACHINE
Filed Aug. 7, 1930  3 Sheets-Sheet 1
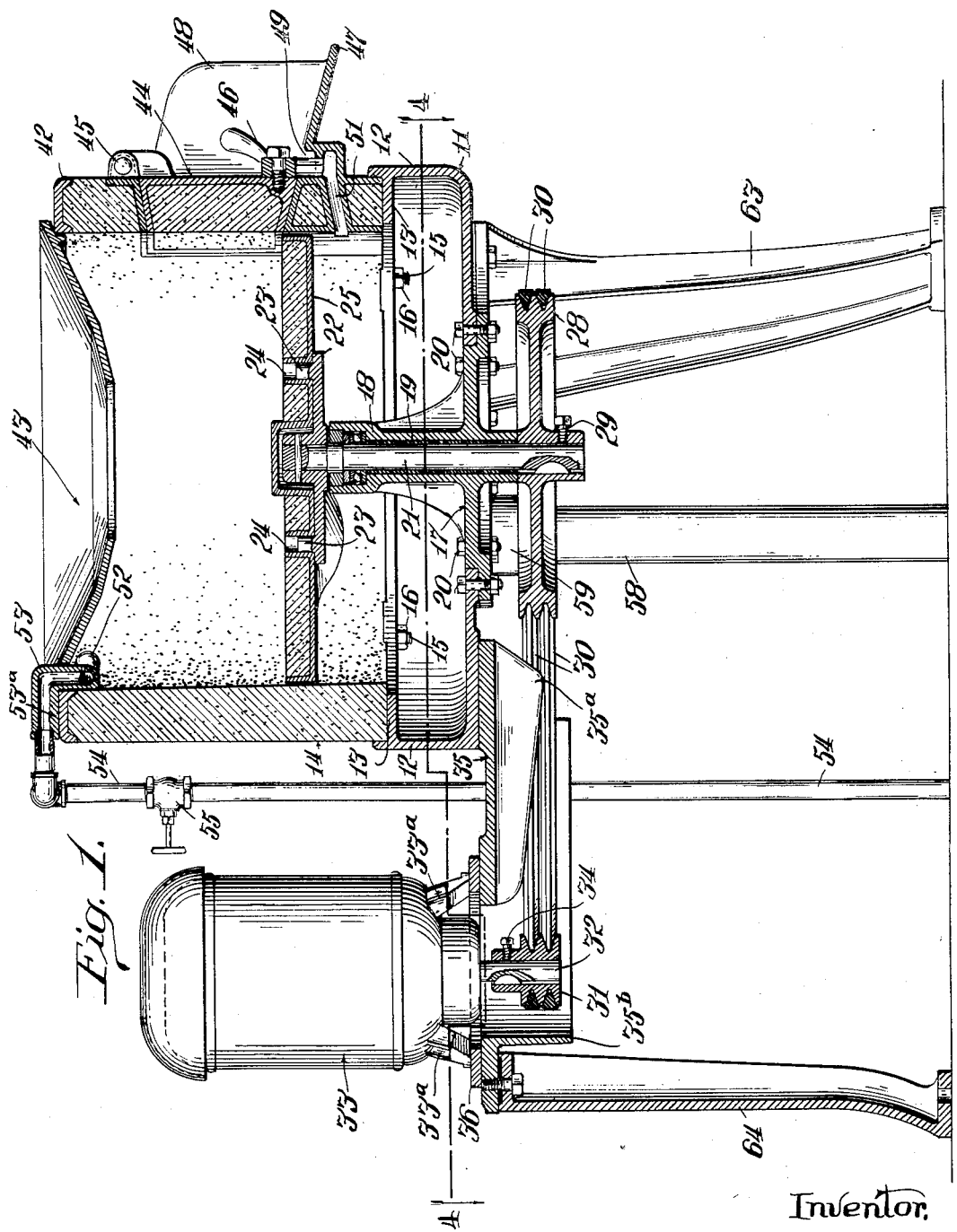

Aug. 22, 1933.  G. P. ANSTISS  1,923,806
PEELING MACHINE
Filed Aug. 7, 1930    3 Sheets-Sheet 2
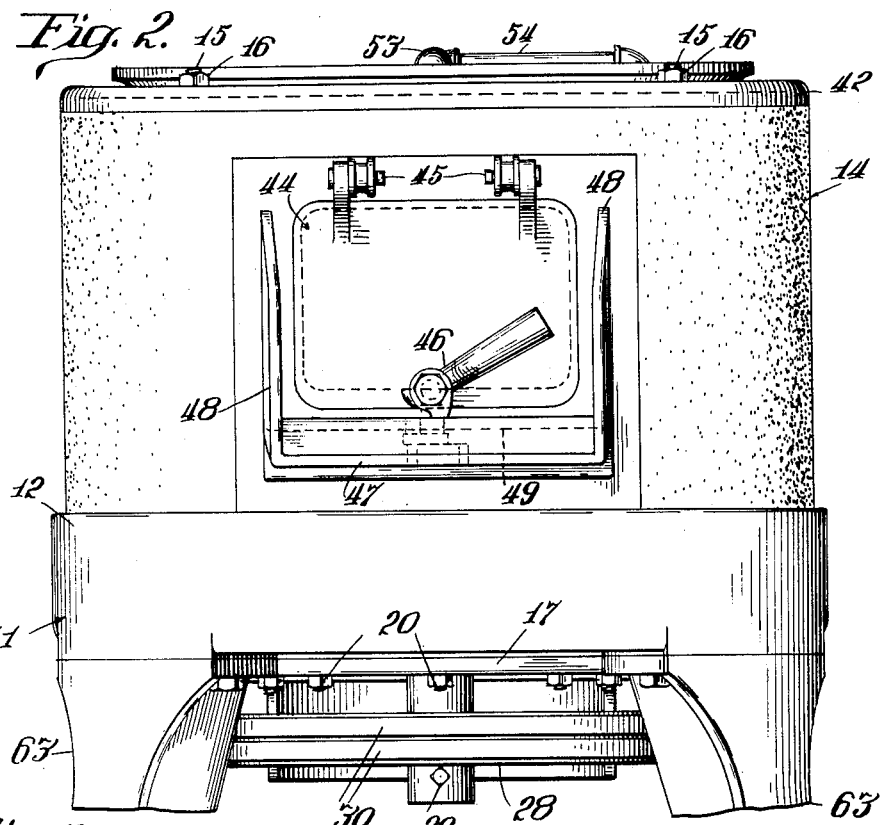
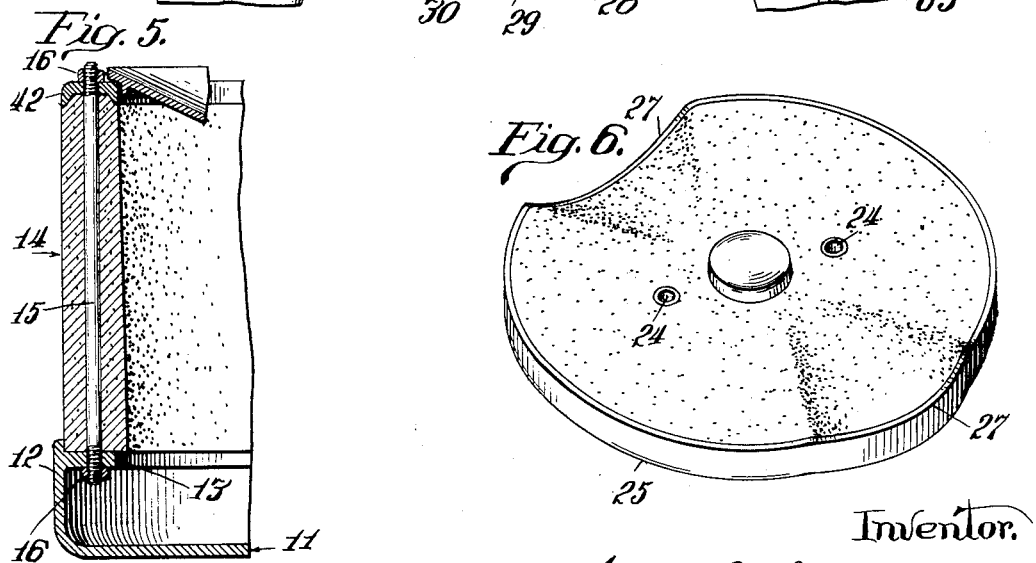
Inventor.
George P. Anstiss,
Brown, Jackson, Boettcher & Dienner.
Attorneys
Witness
Milton Lenoir
By Aug. 22, 1933.   G. P. ANSTISS   1,923,806
PEELING MACHINE
Filed Aug. 7, 1930   3 Sheets-Sheet 3
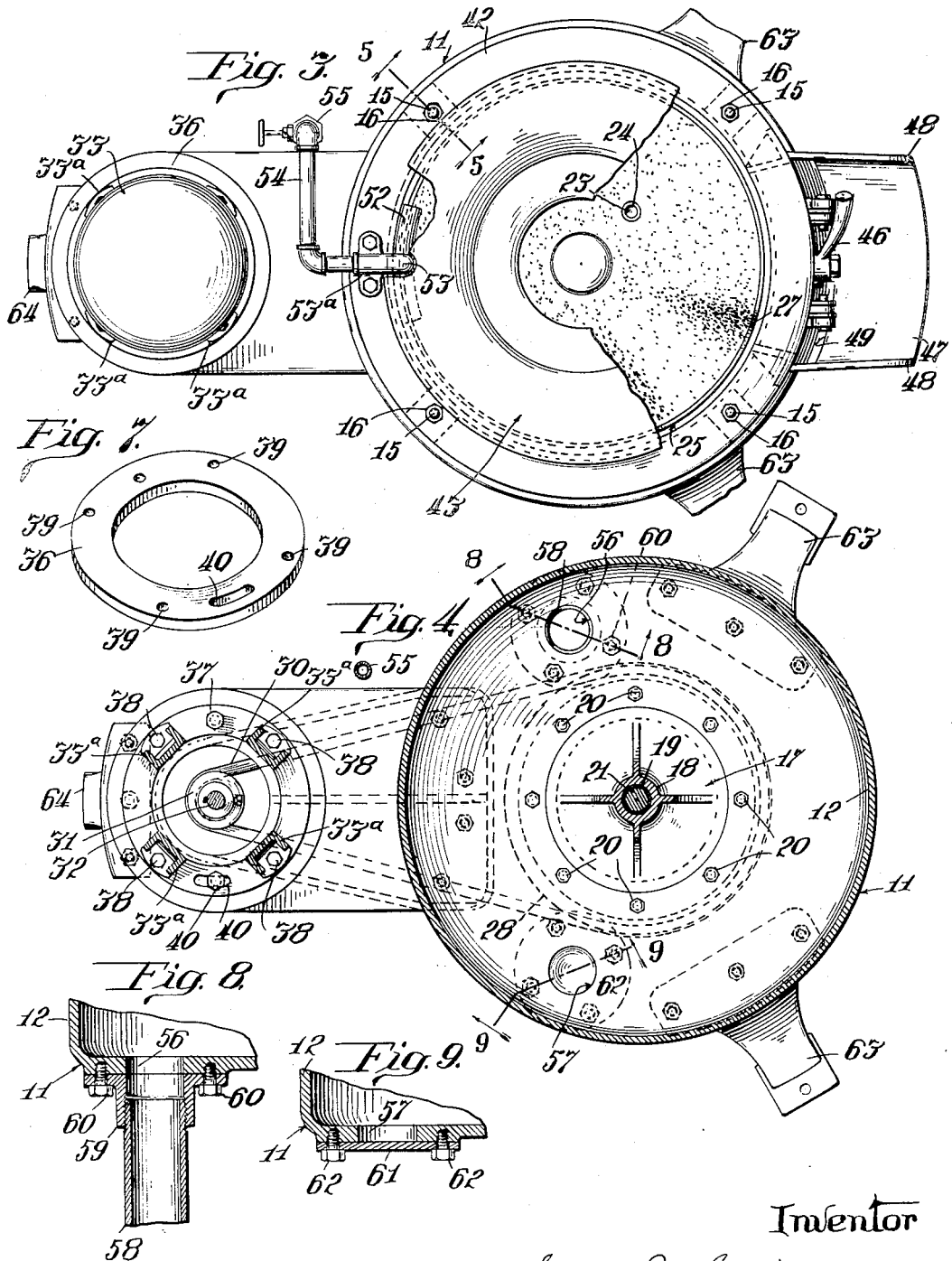

Patented Aug. 22, 1933

1,923,806

UNITED STATES PATENT OFFICE 1,923,806

PEELING MACHINE

George P. Anstiss, River Forest, Ill., assignor to G. S. Blakeslee & Co., Cicero, Ill., a Corporation of Illinois Application August 7, 1930. Serial No. 473,571

2 Claims. (Cl. 146—49)

This invention relates to peeling machines such as are commonly used for peeling potatoes and like articles, and has to do particularly with peeling machines of the type comprising a cylindrical receptacle open at the top, the side wall thereof being in the form of an upright cylinder having an abrasive inner wall, which, in some instances, is provided by making the cylinder throughout of an abrasive composition, and in others, by applying an abrasive lining or coating to the inner surface of a metallic cylinder. Within the cylinder is a rotary bottom plate or disc having an abrasive upper surface, such bottom plate having one or more recesses or protuberances for effecting agitation of the potatoes or other articles being peeled, and accomplishing the peeling by their contact with such abrasive surfaces. Machines of this type are also ordinarily provided with means for spraying water upon the articles under treatment for the purpose of moistening them and thereby promoting the peeling operation, and also for removing the peelings, as is well understood in the art.

One of the objects of my present invention is to provide in a machine of this type a cylinder which is readily and quickly removable so that when it wears out it may be easily replaced, and which is also adapted to be turned about a vertical axis when it is desired to bring the door usually provided in its side wall to a more conveniently accessible point without shifting the machine as a whole.

Another object of the invention is to provide a peeler of the type referred to in which the bottom plate may readily be removed, and the spindle and head that rotatably support it may be dropped as a unit downwardly through an opening in the base for repairs or replacement.

A further object of the invention is to provide a unitary peeler structure comprising peeling means and a motor for driving the operating parts thereof, all mounted on a common base, with the motor in a vertical position at one side of the peeler cylinder and mounted so that it can be readily shifted laterally, to ease or tighten up on the driving belts by which power from the motor is transmitted to the rotary bottom plate, or for applying or removing a belt, or the motor, as the case may be.

A still further object of the invention is to provide a plurality of outlet openings in the base for discharge of the peelings and water so that one or another will always be readily available for connection to a sewer. When but one drain opening is provided, as in prior machines, it has been necessary to either turn the entire machine to bring such drain opening into position to connect it with the sewer, or to provide additional pipes and connections for so doing, which is objectionable.

Further objects and advantageous features will appear from the following description of the preferred embodiment of my invention taken in connection with the accompanying drawings, in which—

Fig. 1 is a vertical section of my improved machine;

Fig. 2 is a side view illustrating the cylindrical receptacle and the door closing the opening in the side wall thereof through which the articles are removed;

Fig. 3 is a top plan view of the machine, partly broken away, illustrating the water spraying means and the rotary bottom plate or disc in the receptacle;

Fig. 4 is a sectional view taken on the line 4—4 of Fig. 1;

Fig. 5 is a vertical sectional view taken on the line 5—5 of Fig. 3, illustrating the means for detachably connecting the cylindrical receptacle to the base;

Fig. 6 is a perspective view of the rotary plate or disc provided in the bottom of the receptacle;

Fig. 7 is a perspective view of the ring plate by which the motor is shiftably connected to its support;

Fig. 8 is a vertical sectional view taken on the line 8—8 of Fig. 4; and

Fig. 9 is a vertical sectional view taken on the line 9—9 of Fig. 4.

Referring to the drawings, 11 indicates the base of the machine which is in the form of a circular casting having an upright marginal flange 12 provided with an inwardly projecting ledge 13 on which is mounted a vertically disposed cylinder 14 that in the form illustrated is composed of a suitable abrasive and a bonding material therefor, said cylinder forming a receptacle in which the potatoes or other articles to be peeled are placed. A channel ring 42 overlies the upper margin of said cylinder, which is detachably connected to the ledge member of the base by means of a plurality of vertically extending rods 15 which pass through the wall of the cylinder and through the ledge 13 and ring 42, nuts 16 being threaded on the opposite ends of said rods below said ledge and above said ring, for securing the parts together, as shown in Fig. 5. This detachable mounting of the cylindrical receptacle on the base is very advantageous in a machine of this type as the cylindrical member usually wears out long before the other parts of the machine, and with this construction a new cylinder may be readily substituted for the worn one when necessary, without scrapping any more of the machine than the worn out receptacle.

As best shown in Fig. 1, the central portion of the base 11 is provided with a concentric opening therein in which is fitted a plate 17 carrying an upright tubular standard 18 having an antifriction lining 19 so that it forms a bearing for an upright spindle or shaft 21 that extends from below said bearing upwardly into the interior of the receptacle above the base. The plate 17 is secured to the base by means of bolts 20, or in any other suitable manner. Keyed upon the upper end of said spindle so that it rotates therewith is a head in the form of a disc 22. The head 22 is provided with a pair of diametrically opposite upstanding lugs 23 that engage in correspondingly positioned openings 24 in an abrasive bottom plate 25 which is positioned on said head, as best shown in Fig. 1, so that said bottom plate rotates with said head. A roller thrust bearing 26 is interposed between the upper portion of the standard 18 and the head 22 to sustain the weight of the head and bottom plate and prevent wear between the parts, and as shown in said figure, the bottom plate extends over the upper end of the spindle and its bearings. In the construction shown the bottom plate 25 is provided with a number of recesses 27 adjacent to its periphery, (see Fig. 6), which serve to effect the agitation of the potatoes as said bottom plate rotates, as is well understood by those familiar with machines of this type. Instead of said recesses humps could be used for that purpose. It should be pointed out here that the opening in the base is large enough so that by removing the bottom plate 25 and disconnecting the plate 17 from the base, the spindle carried by the latter plate, together with the head 22 keyed thereon, may be dropped downwardly through such opening for the purpose of replacing or repairing such parts as may be necessary, and this is an important feature of my present invention.

The lower end of the spindle 21 carries a multiple V-grooved pulley 28, said pulley being provided with a set screw 29 for locking said pulley to said shaft. The pulley 28 is driven by means of a plurality of V-shaped belts 30 from a multiple V-grooved pulley 31 mounted upon the lower end of the armature shaft 32 of a vertically positioned motor 33 suitably supported as hereinafter described at one side of the base 11, constituting a unitary structure. It will be apparent from the above description that when the pulley 31 on the armature shaft of the motor is rotated it will effect the rotation of the vertical spindle or shaft 21 and consequently rotate the bottom plate 25. The belts 30 are of the ordinary rubber composition type in general use, and it is to be understood that if desired a single belt may be used for driving the pulley 28 from the pulley 31, as my invention is not limited to the use of a multi V-belt drive except as may be pointed out in some of the appended claims. The pulley 31 is provided with a locking set screw 34 for securing it to the armature shaft 32 of the motor, and this means of locking the pulley to the shaft is provided so that the pulley may be readily disconnected from the armature shaft when it is desired to remove the motor for any purpose, and also so that the pulley may be adjusted vertically on said armature shaft so as to bring its grooves into alinement with those of the pulley 28 on the spindle 21, this being advantageous particularly because of the fact that different makes of motors have armature shafts of different lengths.

The mounting of the motor on the machine will now be described. Extending laterally from the base 11 and rigidly secured thereto by means of bolts, or in any other suitable manner, is a support 35. As shown in Fig. 1, said support is provided with an integral centrally disposed longitudinally extending reenforcing rib or member 35a for reenforcing the same, and is also provided with an integral downwardly extending skirt or shield 35b for laterally shielding the driving pulley 31 and the driving belts 30. 36 indicates a ring plate pivotally mounted on the upper surface of the support 35 by means of a vertically disposed pivot bolt 37 so that it may be turned about said pivot bolt as an axis to carry its center toward and from the base 11, and the motor 33 is supported on said ring plate with its armature shaft 32 disposed vertically as hereinbefore described. The legs 33a of the motor casing are secured to said ring plate by means of bolts 38 which pass through openings in the horizontally bent portions of said legs and through openings 39 provided therefor in said ring plate, as shown in Figs. 4 and 5. If desired, of course, the motor may be secured to said ring plate in any other appropriate manner. Diametrically opposite the pivot bolt 37 said ring plate is provided with an arcuate slot 40, and a locking bolt 41 extends through said slot and has its lower end threaded into an alined opening provided for said bolt in the support 35. It will be readily understood that by loosening the bolt 41 the ring plate together with the motor mounted thereon may be readily shifted to carry the armature shaft toward and from the base 11, said ring plate turning about the pivot bolt 37 as an axis, and that when the plate has been moved to the desired position it may be secured to the support 35 by again tightening the bolt 41. This shiftability of the plate and motor on the support 35 is provided so that the tension of the belts may be eased or tightened as desired, and it is also advantageous particularly when it is desired to remove a belt or apply a new one, or when it is necessary to remove or replace the motor. By mounting the motor 33 on a ring plate 36 detachably secured to the support 35 provision is made for taking care of motors having armature shafts of different lengths, as ring plates of various thicknesses may be employed, as will be readily understood.

The channel ring 42 that extends over the upper margin of the receptacle forms a protecting member for such upper margin, and it also forms a support for a hopper 43 which rests marginally upon said channel ring and discharges centrally into the receptacle 14 so that potatoes or other articles deposited in said hopper will fall upon the central portion of the bottom plate 23.

A discharge opening is provided in the side wall of the receptacle for the removal of the potatoes or other articles after they have been peeled, and such opening is provided with a door 44 hinged at its upper side margin to the receptacle, as indicated at 45, so that its lower end swings outwardly and upwardly in opening. The inner wall of said door is provided with an abrasive surface similar to that of the cylindrical receptacle, and said door is provided with a latch 46 of any suitable type adjacent its lower outer margin for locking said door in closed position during the peeling operation. Suitably secured to said receptacle 14 and extending outwardly and downwardly therefrom from a point adjacent the lower edge of the door opening is an apron 47 provided with vertically extending side walls 48 at each end. A shown in Fig. 1, the bottom plate of the apron 47 is of such configuration as to form a trough 49 adjacent the lower edge of the door opening, said trough communicating with a drain passageway 51 extending through the wall of the receptacle into the space below the bottom plate 25. This trough and drain passageway is provided for the purpose of returning to the interior of the receptacle, for delivery to the sewer, any water which may escape from the receptacle around the door during the peeling operation, thereby preventing such water from running down the apron onto the floor. When a charge of articles in the receptacle has been peeled they are removed through the discharge opening, rolling down the inclined apron into a receptacle provided below the same for that purpose.

It should be pointed out in this connection that in a machine of this type provided with a door in the side of the receptacle it is very advantageous to have the cylinder detachably connected to the base, as previously described, because with such construction said cylinder may be disconnected from the base and turned to any one of several predetermined positions about a vertical axis on the base, so that the door in the side thereof can be positioned at a convenient point for the discharge of the articles therefrom without making it necessary to shift the entire machine around, such shifting of the machine being somewhat impracticable as it is usually provided with a drain pipe suitably connected with a sewer outlet for carrying away the water and peelings. It will therefore be seen that this detachable connection between the cylinder and the base is an important feature of the present invention.

Water is supplied to the receptacle 14 through a head 52 in the form of a hollow casting curved to conform to the curvature of the receptacle 14 so that it is adapted to fit against the inner surface of the channel ring 42. The ends of the head are closed, and at some convenient point, preferably intermediate its ends, it is provided with a tubular elbow 53 that rises therefrom and is adapted to extend over the upper surface of the channel ring 42, a suitable clip 53a being provided for securing said elbow in position on said channel ring, as shown in Fig. 3. As also shown in said figure, the outer end of said elbow is suitably connected with a water supply pipe 54, to which water under pressure is supplied from any suitable source, the pipe 54 being provided with a valve 55 of any suitable type for turning on or shutting off the water supply to the head as desired. This water supplying means has nothing to do with my present invention, and, therefore, has been only briefly described herein.

The diameter of the bottom plate 25 is slightly less than the interior diameter of the cylinder 14 so that the peelings may pass down between the peripheral portion of said bottom plate and the inner wall of the cylinder into the base 11, from which they are carried by the water introduced into said cylinder as above described through either one of a pair of discharge openings 56, 57, provided for that purpose in said base. In the present machine I have provided two such discharge openings in the bottom wall of the base 11, said openings being positioned near the periphery of the base at points preferably less than 120° apart as shown, so that they will be spaced a considerable distance apart in order that one or the other of said openings will always be readily available for connection to a sewer outlet. As shown in Figs. 4 and 8, the discharge opening 56 is provided with a drain pipe 58 having its upper end threaded into an internally threaded flanged bushing which is suitably secured to the bottom of the base by means of screws 60 (see Fig. 8). As will be understood, the lower end of the drain pipe 58 is suitably connected with a sewer outlet. As shown in Figs. 4 and 9, the discharge opening 57 at the opposite side of the base is closed by a closure plate 61 suitably secured to the under side of the base by screws 62. It is to be understood that the construction is such that the bushing and closure plate may be connected with the bottom plate 11 at either of said discharge openings 56 or 57, so that the positions of the closure plate and bushing as shown in Fig. 4 may be reversed as desired. With the present construction, therefore, whichever discharge opening is most convenient to the sewer outlet will be connected with it by the drain pipe 58, while the other opening will be closed by the closure plate 61, as will be readily understood.

The base 11 is preferably mounted on legs 63, 64 so that the cylinder 14 and motor 33 are carried at a convenient height above the floor, one of the legs 63 being positioned at either side of the door 44, as shown in Fig. 3, and the leg 64 being located adjacent to the motor, as shown in Figs. 1, 3 and 4.

I claim:

1. A peeling machine comprising a base provided with a plurality of spaced openings therein, a cylindrical receptacle having an abrasive inner surface, a plurality of vertical rods extending through the walls of said receptacle and through the openings in the base for securing said receptacle to said base, a door at one side of said receptacle, and a rotary bottom plate in said receptacle, said rods and said openings being equidistant from each other whereby said receptacle may be secured to said base in a plurality of predetermined positions, to vary the position of the door with respect thereto.

2. A peeling machine comprising a base, a cylindrical receptacle having an abrasive inner surface, a channel ring on the upper edge of said cylinder, rods extending vertically through said channel ring, through the walls of said receptacle, and through said base for detachably securing said receptacle to said base, a rotary bottom plate in said receptacle, a door at one side of said receptacle, water spraying means for spraying water on the articles in said receptacle, and a plurality of bottom discharge openings at approximately opposite sides of said base.

GEORGE P. ANSTISS.